United States Patent [19]

Candlin et al.

[11] 4,299,936

[45] Nov. 10, 1981

[54] SUPPORTED ARENE COMPLEX OLEFIN CATALYSIS

[75] Inventors: John P. Candlin, Aston near Stevenage; Keith C. Wilson, St. Albans; Ronald Pearce, Runcorn, all of England

[73] Assignee: Imperial Chemical Industries Limited, London, England

[21] Appl. No.: 931,731

[22] Filed: Aug. 7, 1978

Related U.S. Application Data

[62] Division of Ser. No. 744,827, Nov. 24, 1976, Pat. No. 4,121,030.

[30] Foreign Application Priority Data

Nov. 25, 1975 [GB] United Kingdom ............... 48406/75

[51] Int. Cl.$^3$ .................... C08F 4/02; C08F 4/64; C08F 4/76; C08F 10/06
[52] U.S. Cl. .................... 526/119; 252/428; 252/429 A; 252/429 R; 252/431 R; 428/441; 428/461; 526/77; 526/113; 526/114; 526/118; 526/123; 526/124; 526/125; 526/126; 526/129; 526/135; 526/137; 526/139; 526/140; 526/141; 526/142; 526/144; 526/151; 526/153; 526/154; 526/155; 526/156; 526/335; 526/348.2; 526/351; 526/352
[58] Field of Search .............. 526/119, 125, 151, 153, 526/351, 118, 123, 142, 154

[56] References Cited

U.S. PATENT DOCUMENTS

| | | | |
|---|---|---|---|
| 3,123,571 | 3/1964 | Walker et al. ..................... 252/430 |
| 3,157,712 | 11/1964 | Walker et al. ................. 260/683.15 |
| 3,297,671 | 1/1967 | Natta et al. ........................ 526/154 |
| 3,379,706 | 4/1968 | Wilke ................................. 260/943 |
| 3,494,873 | 2/1970 | Vohwwirel et al. ............... 252/429 |
| 3,635,935 | 1/1972 | Long .................................. 260/94.9 |
| 3,660,369 | 5/1972 | Kormer et al. .................... 260/93.1 |
| 3,888,789 | 6/1975 | Pombro et al. ..................... 252/429 |
| 4,013,823 | 3/1977 | Longi et al. ........................ 526/166 |
| 4,079,175 | 3/1978 | Tokunaga et al. ................. 526/153 |
| 4,093,789 | 6/1978 | Kuroda et al. .................... 526/119 |
| 4,107,412 | 8/1978 | Welch ................................ 526/125 |
| 4,107,415 | 8/1978 | Giannini et al. ................... 526/125 |
| 4,121,030 | 10/1978 | Candlin et al. .................... 526/129 |

FOREIGN PATENT DOCUMENTS 2455415 5/1975 Fed. Rep. of Germany .
2237902 7/1973 France .
1464909 2/1977 United Kingdom .

OTHER PUBLICATIONS

Journal of the Chemical Society, Chemical Communications (3), 1979, pp. 127 and 128.

*Primary Examiner*—Stanford M. Levin
*Attorney, Agent, or Firm*—Cushman, Darby & Cushman

[57] ABSTRACT

A transition metal compound containing at least one $\pi$-bonded arene is contacted with an inorganic oxide, hydroxide, oxyhalide, hydroxyhalide or halide. The transition metal compound can be a compound such as titanium(O)ditoluene or $TiCl_2 \cdot 2AlCl_3$ durene. The inorganic compound is preferably of high surface area and this may be inherent in the compound or can be achieved by a grinding procedure. The inorganic compound can be treated with a halogen containing compound either before, during or after the contacting with the transition metal compound. The product of the contacting is useful either as catalyst for the polymerization of unsaturated hydrocarbon monomers or as a component of such a catalyst. When used as a component of an olefine polymerization catalyst, the transition metal product can be mixed with an organo-aluminum compound and a Lewis Base compound such as an ester. The catalysts can be used to polymerize or copolymerize olefine monomers to obtain a high yield of a polymer having good properties. Some of the catalysts produce polymers of high molecular weight which have an interesting combination of properties.

24 Claims, 1 Drawing Figure

U.S. Patent   Nov. 10, 1981   4,299,936
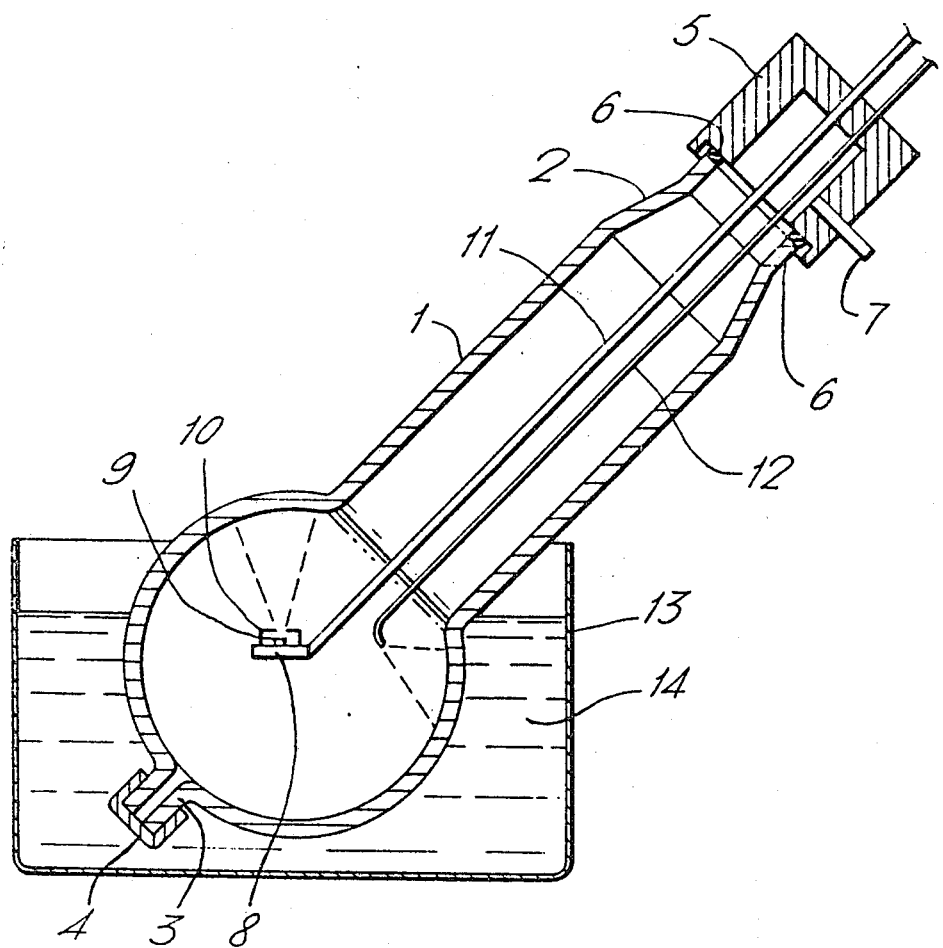

SUPPORTED ARENE COMPLEX OLEFIN CATALYSIS

This is a division, of application Ser. No. 744,827 filed Nov. 24, 1976, U.S. Pat. No. 4,121,030, Oct. 17, 1978.

The present invention relates to the treatment of compounds of transition metals and to the use of the treated compounds as catalysts, or components of catalysts, for the polymerization of ethylenically unsaturated hydrocarbon monomers.

According to the present invention there is provided a process for the treatment of compounds of transition metals wherein a compound of a transition metal of Groups IVA or VA of the Periodic Table, which compound contains at least one $\pi$-bonded arene group, is contacted with a particulate inorganic compound which is (A) an inorganic oxide, an inorganic hydroxide, an inorganic oxyhalide, an inorganic hydroxyhalide or an inorganic halide; (B) a mixture of at least two compounds from A; or (C) a compound obtained by the reaction of at least two compounds from A.

The transition metal compound is contacted with the inorganic compound in proportions such that from 0.05 up to 50% by weight of the transition metal compound is used relative to the inorganic compound. Typically the amount of the transition metal compound is such as to provide from 0.5 up to 20% by weight of the transition metal compound relative to the inorganic compound.

The transition metal is preferably a metal of Group IVA and is particularly titanium. The transition metal compound may contain only the $\pi$-bonded arene group or groups, or may also contain other groupings such as halogen atoms, and the compound may be in the form of a complex with other compounds. In the transition metal compound the valency of the metal may be zero or any valency wherein the transition metal is able to form a stable compound containing at least one $\pi$-bonded arene group. Suitable transition metal compounds include for example titanium(O)ditoluene or a titanium dichloride-aluminium chloride-arene complex where the arene group is any suitable arene for example durene (1,2,4,5-tetramethylbenzene). The term "arene" as used herein is used to mean a compound containing a six-membered hydrocarbyl ring which ring contains a completely delocalized double bond system. It will be appreciated that the term arene is used to include benzene, toluene, xylene, durene, hexamethylbenzene and substituted derivatives thereof such as chlorobenzene.

The inorganic compound preferably has a high surface area and it will be appreciated that some compounds of this type inherently have such a high surface area whereas with other compounds it is necessary to grind or otherwise comminute the inorganic compound in order to achieve a satisfactorily high surface area. It is preferred that the surface area of the inorganic compound is at least 1 m$^2$/g and it is particularly preferred that the area is at least 10 m$^2$/g and especially 30 m$^2$/g. Suitable inorganic compounds include alumina, mixtures of alumina and silica, the mixed oxide of aluminum and silicon, magnesium dihalide and manganese dihalide, and, in the case of the latter two compounds, in order to achieve a high surface area it is desirable that they be subjected to a grinding operation. If the inorganic compound is to be ground to achieve a high surface area, the grinding can be effected before or after contacting with the transition metal compound or the contacting can be effected during the grinding operation.

Before, during or after the contacting of the inorganic compound with the transition metal compound, the inorganic compound may also be treated with a halogen-containing compound which may be either an organic or inorganic compound. Suitable halogen-containing compounds include hydrogen chloride, titanium tetrachloride and toluoyl chloride. The amount of the halogen-containing compound which is used is preferably at least 0.10 moles per g atom of transition metal which is present in the transition metal compound, and is very preferably at least 0.5 moles per g atom of the transition metal compound. Very conveniently a molar excess of the halogen-containing compound is used and any excess of the halogen-containing compound which remains after completion of the treatment may be removed using any suitable technique such as filtration and/or washing with an inert liquid.

In addition to, or as an alternative to, the treatment with the halogen-containing compound, the inorganic compound may be treated with an organic Lewis Base, which organic Lewis Base could be present complexed with the transition metal compound. A wide range of organic Lewis Base compounds have been proposed for use as components of Ziegler catalyst systems, and any such compounds may be used. Thus, the organo-Lewis Base compound may be an ether, an ester, a ketone, an alcohol, a sulphur-containing analogue of ethers, esters, ketones and alcohols, an organo-silicon compound, an amide, urea or thiourea, an alkanolamine, an amine, a cyclic amine, a diamine or an organo-phosphorus compound such as an organo-phosphine, an organo-phosphine oxide, an organo-phosphite or organo-phosphate. The use of organo-Lewis Base compounds is disclosed inter alia in British Patent Specifications Nos. 803,198, 809,717, 880,998, 896,509, 920,118, 921,954, 933,236, 940,125, 966,025, 969,074, 971,248, 1,013,363, 1,017,977, 1,049,723, 1,122,010, 1,150,845, 1,208,815, 1,234,657, 1,324,173, 1,359,328 and 1,383,207, Belgian Patent Specification No. 693 551 and published German Patent Application No. 2 329 723. If an organo-Lewis Base compound is included in the system, the proportion of the organo-Lewis Base compound is preferably at least 0.1 moles per g atom of the transition metal which is present in the transition metal compound, very preferably not more than 5 moles, and especially not more than one mole, of the Lewis Base compound per g atom of transition metal.

The contacting of the transition metal compound with the inorganic compound is conveniently effected by contacting the inorganic compound with a solution of the transition metal compound in a hydrocarbon or other inert diluent. The contacting may be effected by stirring a suspension of the inorganic compound in a suitable inert diluent with a solution of the transition metal compound, or may be effected by grinding the inorganic compound in the presence of the transition metal compound, which may, if desired, be in solution in a suitable inert liquid. However, the inorganic compound may be subjected to a grinding step either before or after it has been contacted with the transition metal compound, and it is not necessary to effect grinding of the inorganic compound in the presence of the transition metal compound.

The contacting of the transition metal compound with the inorganic compound may be effected at any suitable temperature but it is preferred to use temperatures of ambient temperature or below, particularly when using compounds such as titanium(O)ditoluene which are thermally unstable. The solvent used for the dissolution of the transition metal compound may be any suitable inert liquid and is conveniently an aromatic liquid since many of the transition metal compounds have a greater solubility in such diluents. If the inorganic compound is subjected to a grinding step, this can be effected in any known manner for example in a rotating ball mill or in a vibrating ball mill. The time of grinding will be dependent on a number of factors including the nature of the material to be ground, the particle size desired in the ground product and the intensity of the grinding. In general a time of from 1 hour up to 100 hours is sufficient to effect the requisite comminution of the inorganic material. The milling can be effected at any desired temperature but in general it is preferred that the grinding is effected at ambient temperature or below particularly if the grinding is being effected in the presence of a thermally unstable transition metal compound.

Although some of the transition metal compounds are thermally unstable and have to be stored at low temperature, for example titanium(O)ditoluene has to be stored at about $-78°$ C., the product of contacting the transition metal compound with the inorganic compound has improved stability and can be stored at ambient temperature without appreciable deterioration. Thus the product of contacting the transition metal compound with the inorganic compound can be stored as a dry solid or as a suspension in a suitable inert liquid and we have found that, even when stored as a suspension for a week or more, the product still possesses considerable activity as a catalyst, or a component of a catalyst, for the polymerization of ethylenically unsaturated hydrocarbon monomers.

The product of contacting the transition metal compound with the inorganic compound can be used, either alone or together with other compounds such as the organic compound of a non-transition metal of Groups IA and IIA or of aluminum, to polymerize ethylenically unsaturated hydrocarbon monomers.

Thus, as a further aspect of the present invention there is provided a catalyst suitable for the polymerization of ethylenically unsaturated hydrocarbon monomers, which catalyst contains a transition metal component which is the product of contacting a transition metal compound of a metal of Groups IVA or VA of the Periodic Table, which compound contains at least one $\pi$-bonded arene, with an inorganic compound which is (A) an inorganic oxide, an inorganic hydroxide, an inorganic oxyhalide, an inorganic hydroxyhalide or an inorganic halide, (B) a mixture of at least two compounds from A; or (C) a compound obtained by the reaction of at least two compounds from A.

The catalyst may be a single component catalyst system which consists solely of the transition metal component but the catalyst may include, as a second component, at least one organo-metallic compound of aluminum or of a non-transition metal of Group IIA of the Periodic Table or a complex of an organo-metallic compound of a non-transition metal of Group IA or IIA of the Periodic Table and an organo-aluminum compound.

The second component of the catalyst system can be a Grignard reagent which is substantially ether free or a compound of the type $Mg(C_6H_5)_2$. Alternatively, the second component can be a complex of an organo-metallic compound of a non-transition metal of Groups IA or IIA with an organo-aluminum compound for example $Mg[Al(C_2H_5)_4]_2$ or lithium aluminum tetraalkyl. It is preferred that the second component is an organo-aluminum compound such as a bis(dialkyl aluminum)oxyalkane, a bis(dialkyl aluminum)oxide, an aluminum hydrocarbyl sulphate, an aluminum hydrocarbyloxyhydrocarbyl or particularly an aluminum trihydrocarbyl or dihydrocarbyl aluminum halide or hydride. We particularly prefer to use either an aluminum trialkyl such as aluminum triethyl or an aluminum dialkyl halide such as diethyl aluminum chloride. We particularly prefer that the second component is a halogen-free material for example an aluminum trialkyl.

In addition to the first and second components, the catalyst may also contain other components for example organo-Lewis Base compounds. The organo-Lewis Base compound may be the same as, or different from, the organo-Lewis Base compound with which the inorganic compound and the transition metal compound are optionally treated. Thus the organic Lewis Base compound which may be used as a possible third component of the catalyst may be any Lewis Base compound of the type previously described. The Lewis Base compound may be incorporated in to the catalyst system as a complex with the organo-metallic component of the catalyst. Suitable complexes of the organo-Lewis Base compound and the organo-metallic compound include complexes of aluminum trialkyl with esters and in particular with aromatic esters such as ethyl benzoate or ethyl anisate.

In addition to or instead of the Lewis Base compound the catalyst may also contain a substituted or unsubstituted polyene. The polyene may be an acyclic polyene such as 3-methylheptatriene-1,4,6 or a cyclic polyene such as cyclooctatriene, cyclooctatetraene or cycloheptatriene or may be a derivative of such cyclic polyenes for example the alkyl- or alkoxy-substituted polyenes, tropylium salts or complexes, tropolone or tropone.

The proportions of the catalyst components can be varied quite widely depending on the particular materials used and the absolute concentrations of the components. The proportions will also be dependent on the monomer which is to be polymerized. However, if the catalyst system includes components in addition to the transition metal component, then these may be present in the conventional proportions for Ziegler catalyst systems. More specifically, for each gram atom of the transition metal which is present in the product of contacting the transition metal compound with the inorganic compound, there should be present at least 0.05 and preferably at least 1 mole of the organo-metallic compound which is the second component of the catalyst. However, in general it is preferred to use larger quantities of the organo-metallic component and the proportion of this compound may be as high as 100 moles for each gram atom of the transition metal compound, although we prefer to use smaller proportions of the organo-metallic compounds, for example not more than 25, and particularly not more than 10 moles, of the second component for each gram atom of the transition metal. If a Lewis Base component is also present in the catalyst system, the number of moles of the Lewis Base compound should not be greater than the number of moles of the organo-metallic compound which is the second component of the catalyst. If the catalyst includes a polyene, then the molar proportion of the polyene is preferably less than the molar proportion of the second component. Preferably for each mole of the second component there is present from 0.05 up to 0.5 particularly from 0.1 up to 0.2 moles of the polyene.

The catalyst of the present invention can be used to polymerize ethylenically unsaturated hydrocarbon monomers by contacting at least one such monomer with a catalyst of the type hereinbefore described.

More specifically there is provided a process for the production of a hydrocarbon polymer wherein at least one ethylenically unsaturated hydrocarbon monomer is contacted with a polymerization catalyst of the type hereinbefore described.

The ethylenically unsaturated hydrocarbon monomer may be a mono-olefine and may be any which is capable of being polymerized using a Ziegler catalyst system. Thus monomers which can be polymerized by the process of the present invention may be mono-olefines containing up to 18 carbon atoms, for example butene-1 and 4-methylpentene-1 and particularly ethylene and propylene. If desired the olefines, particularly ethylene and propylene, may be copolymerized together for example using a sequential polymerization technique such as is described in British Patent Specifications Nos. 970,478, 970,479 and 1,014,944. The monomer may, alternatively, be a diene or polyene such as, for example, butadiene.

The polymer product obtained is affected by the nature of the catalyst system and, in particular, appears to be influenced by the nature of the catalyst support. Thus, if the support is an oxide, particularly one containing alumina, the catalyst preferably consists of the supported π-arene compound only. We have obtained high yields of polyethylene by effecting the polymerization of ethylene, using as the catalyst, titanium(O)ditoluene supported on alumina. The polyethylene thus obtained has a high molecular weight as indicated by the fact that the melt flow index (measured at 190° C. using a 2.16 kg weight) is essentially zero.

Surprisingly we have found that propylene can be polymerized to give a solid polymeric product using a π-arene compound supported on an oxide as the sole catalyst. The product obtained has a combination of properties which are believed to be unique.

More specifically there is provided a solid propylene polymer having a melt flow index of not greater than 0.02 (measured at 190° C. using a 10 kg weight), and at least 3 head-to-head units for each 100 propylene units.

The polymer typically has a melt flow index of less than 0.01 at 190° C. and 10 kg.

The number of head-to-head units in the solid polymer is typically about 4 for each 100 propylene units and does not exceed about 6 for each 100 propylene units. By "head-to-head units" is meant a structure of the type

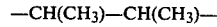
—CH(CH$_3$)—CH(CH$_3$)— in the polymer chain. It will be appreciated that in commercially available propylene polymers, the structure is essentially all of the "head-to-tail" type, that is

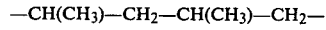
—CH(CH$_3$)—CH$_2$—CH(CH$_3$)—CH$_2$—

The presence of head-to-head units in a structure of the type

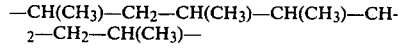
—CH(CH$_3$)—CH$_2$—CH(CH$_3$)—CH(CH$_3$)—CH$_2$—CH$_2$—CH(CH$_3$)— has been established by carbon-13 nuclear magnetic resonance ($^{13}$Cnmr) and infrared spectroscopy (an absorption band at 752 cm$^{-1}$).

The polymer is substantially isotactic, as determined by $^{13}$Cnmr and proton magnetic resonance (pmr), and has an isotactic content of at least 70%, typically about 80%, as determined from the triads which are mm centered.

The polymer contains at least 5% of racemic diads, as measured by pmr. The percentage of racemic diads does not, in general, exceed 15% and is typically about 9 to 12%.

The polymer has some elastomeric properties and elongations of at least 1000% have been achieved. On removal of the stress, the test specimen showed partial recovery to about 200% elongation.

The polymer has a low glass transition temperature (measured using a torsional pendulum) which is below 0° C. and typically between −20° and −10° C.

The polymer has a low temperature brittle point which can be below −20° C., for example −26° C.

The polymer is conveniently obtained by polymerizing propylene at a temperature of at least 40° C. in the presence of a catalyst which is the product of contacting a compound of a transition metal of Groups IVA or VA of the Periodic Table, which compound contains at least one π-bonded arene group, with an inorganic oxide which is, or which contains, aluminum oxide.

Whilst the catalyst system can include a conventional organo-metallic compound of a non-transition metal such as aluminum, since the presence of such compounds has no significantly useful effect, we prefer to use the supported transition metal compound as the only catalyst component. The polymerization process is conveniently effected in an inert hydrocarbon diluent and may be effected in the presence of hydrogen. A small proportion (not more than about 5% of the total polymer yield) of a diluent soluble polymer is formed, and this polymer has characteristics which are similar to those of the insoluble, solid polymer but has a lower proportion of isotactic polymer and a larger proportion of head-to-head units.

In contrast to the behaviour of the catalyst systems supported on inorganic oxides, those supported on inorganic halides, such as magnesium chloride, polymerize olefin monomers to high, but not ultra high, molecular weight products. Using catalyst systems supported on inorganic halides, it is preferred that the catalyst system includes a second component which is an organo-metallic compound of aluminum or of a non-transition metal of Group IIA of the Periodic Table, or a complex of a non-transition metal of Group IA or IIA of the Periodic Table and an organo-aluminum compound. For the polymerization of propylene and higher olefines, it is particularly preferred that such catalyst systems also include an organo-Lewis Base compound.

We have found that the process of the present invention can be used to obtain a high yield of a polymer relative to the amount of the catalyst used. If the polymer being polymerized is propylene, or a higher olefine, then, if the preferred catalyst systems are used, a relatively low proportion of the undesirable soluble polymer may also be obtained. For the polymerization of propylene and higher olefines, particularly good results have been obtained using a transition metal component which is a product of contacting the transition metal compound, for example titanium(O)ditoluene, with the inorganic compound, especially magnesium chloride, and treating the inorganic compound either before, during or after the contacting with the transition metal compound with a halogen-containing material for example toluoyl chloride, and effecting polymerization in the presence of an aluminum trihydrocarbyl compound, such as aluminum triethyl and an ester such as ethyl anisate.

It is well known that many catalysts which can be used to polymerize ethylenically unsaturated monomers are susceptible to the effects of impurities and the activity and stereospecificity of such catalysts can be affected in a detrimental manner by the presence of small quantities of impurities, particularly oxygen and polar compounds such as water and alcohol. Thus at all stages in the preparation and use of the products of the present invention, the materials should preferably be handled in an inert atmosphere which is substantially free of oxygen and oxygen-containing impurities. Similarly, the monomers (and diluents, if any) should also be substantially free of oxygen and oxygen-containing impurities. However, catalysts in accordance with the present invention can be used in smaller proportions than the conventional Ziegler type catalyst and accordingly are more susceptible to any impurities present in the system. Thus, for use with the catalyst of the present invention, it is desirable that the monomers and any diluents which are of commercial purity are subjected to a further purification procedure. It is preferred to use a monomer containing less than 1 ppm by volume of water and less than 0.5 ppm by volume of oxygen, and a diluent containing less than 10 ppm by weight of each of water and oxygen.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer or diluent, for example as described in British Patent Specifications Nos. 1,111,493 and 1,226,659.

Using catalysts in accordance with the present invention, polymerization can be carried out in the presence or absence of an inert diluent such as a suitably purified paraffinic hydrocarbon. If a diluent is not used, polymerization can be effected in the liquid phase using excess liquid monomer as the suspension medium for catalyst and polymer product. If the monomer is used in the gaseous phase, polymerization can be effected using any technique suitable for effecting a gas/solid reaction such as a fluidized bed reactor system or a ribbon blender type of reactor.

Polymerization may be effected either in a batch manner or on a continuous basis. The catalyst components may be introduced into the polymerization vessel separately but it may be preferred, particularly if polymerization is being effected on a continuous basis, to mix all the catalyst components together before they are introduced into the polymerization reactor. Alternatively, a proportion of the catalyst may be added to initiate polymerization and further quantities of one or more of the catalyst components are added at one or more times during the polymerization. Conveniently at least 25% of each catalyst component is added to initiate polymerization, the remaining catalyst components being added during the polymerization. The reaction product of the transition metal compound and the inorganic compound is a solid material and since feeding a slurry of this solid material may be inconvenient, it may be preferred that all of the said reaction product is added, together with some of each of the other catalyst components, to initiate polymerization and the rest of the other catalyst components are added during the polymerization. It is desirable that in any mixing of the catalyst components the transition metal-containing component is not allowed to come into contact with any organo-Lewis Base compound which is present as the third component in the absence of the organo-metallic compound which is the second component of the catalyst.

The polymerization can be effected in the presence of a chain transfer agent such as hydrogen or a zinc dialkyl, in order to control the molecular weight of the product formed. If hydrogen is used as the chain transfer agent it is conveniently used in an amount of from 0.01 up to 5.0%, particularly from 0.10 up to 2.0% molar relative to the monomer. The amount of chain transfer agent will be dependent on the polymerization conditions, including the catalyst system and especially the temperature which is typically in the range from 20° up to 100° C., preferably from 50° up to 80° C. It will be appreciated that some control of the molecular weight of the product formed can be achieved by variation in the polymerization temperature.

Using catalysts in accordance with the present invention particularly two or more component catalysts wherein the transition metal component has been obtained by contacting the transition metal compound with the inorganic compound and also treating the inorganic compound with a halogen containing material, we have been able to polymerize propylene to obtain a high yield of polymer which has a high flexural modulus. Thus when using a catalyst containing a titanium compound, after only one hour of polymerization, we have obtained a propylene polymer having less than 50 parts per million by weight of titanium from the residual catalyst and having a flexural modulus of at least 1.00 $GN/m^2$. The flexural modulus of the polymer is the modulus as measured by the apparatus as described in Polymer Age, March 1970, pages 57 and 58 at 1% skin strain after 60 seconds at 23° C. and 50% relative humidity using test sample as prepared in Examples 13 to 19.

The transition metal content of the polymer may be determined by any suitable analytical technique for example X-ray fluoroescence spectrometry.

Propylene homopolymers prepared by the process of the present invention may have a residual transition metal content, particularly a residual titanium content of about 10 to 20 parts per million by weight and have a flexural modulus of about 1.20 $GN/m^2$.

The polymers obtained have a high molecular weight as indicated by the melt flow index measured according to the ASTM Test Method 1238 of 1970. Thus propylene polymers having a melt flow index of less than 200 preferably less than 100 particularly less than 50 for example between 5 and 50 may be obtained, the melt flow index being measured at a temperature of 190° C. and a weight of 10 kilograms.

Various aspects of the present invention will now be described with reference to the following Examples which are illustrative of the invention. In all the Examples, unless otherwise stated, all operations were effected in a nitrogen (British Oxygen Company—White Spot grade) atmosphere, and all the solvents and diluents used had been purged with nitrogen.

Preparation of Transition Metal π-Bonded Arene Complexes

A. Preparation of Titanium Dichloride-Aluminum Chloride-Durene Complex 20 g of aluminum power (BDH fine powder) and 27 g of aluminum chloride were introduced into a two liter flask. The mixture of solids was stirred and heated to a temperature of 130° C., which temperature was maintained for two hours. The mixture was then cooled, and a solution of 15.5 g of durene in one liter of toluene was added. The flask contents were stirred and heated to reflux temperature. 19.9 g of titanium tetrachloride in 100 ml of toluene were added dropwise over a period of 30 minutes. Heating was continued, at reflux temperature, for a further hour and the mixture was then allowed to cool. The mixture was then filtered and the filtrate was allowed to run directly into 2.5 liters of n-heptane. A dark-colored precipitate separated out and was filtered and then washed four times with 250 ml of n-heptane for each wash. The precipitate was then dried under vacuum (0.2 mm pressure) at ambient temperature (about 20° C.).

B. Preparation of Titanium(O)ditoluene

The procedure and apparatus used were as generally described in J. C. S. Chem. Comm. 1973, pages 866 and 867.

The apparatus is illustrated in the accompanying drawing. A glass flask 1, the neck of which is tapered to provide a narrow portion 2, is also provided with an outlet tube 3, the tube 3 being sealed with a ground glass end cap 4. A metal end block 5 is positioned at the end of the neck portion 2 of the flask 1. A sealing ring 6 is located within a groove in the bottom face of the block 5 and this sealing ring 6 contacts the end (upper) face of the neck portion 2 to provide a seal between the flask 1 and the block 5. The block 5 is provided with a side arm 7 which is connected to a vacuum pump (not shown).

Within the flask 1 is located an electron beam gun 8, a titanium billet 9 and a shield 10. The whole of this assembly is mounted on an arm 11 which contains high and low voltage leads and also circulating pipes for supply and removal of cooling water. A tube 12 is also provided in the flask 1. The arm 11 and the tube 12 pass through the closed top end of the end block 5.

The bottom portion of the flask 1 is positioned within a refrigerated bath 13 which contains liquid nitrogen 14. A motor (not shown) is also provided to rotate the flask within the liquid nitrogen 14.

Using a 5 liter flask, titanium(O)ditoluene was prepared as follows.

The flask was evacuated to a pressure of $10^{-4}$ mm of mercury, immersed in the liquid nitrogen 14 and rotated at 70 rpm. The titanium billet 9 was approximately 4 g in weight and the electron beam gun 8 was operated for 3 hours at a power of 400 W (sufficient to evaporate about 0.8 g per hour of titanium). Toluene vapour was led into the flask at a rate of about 60 ml per hour through the tube 12, from the end of which the vapor was directed onto the inner surface of the flask on which it solidified. The assembly of the gun 8, billet 9 and shield 10 was located to direct the evaporated titanium onto the solidified toluene where reaction occurred.

After 3 hours, evaporation of the titanium was stopped, the bath 13 was removed and argon was admitted to the flask whilst rotating the flask at 30 rpm. Rotation of the flask was stopped, the end cap 4 removed and an argon purged Schlenk tube was placed on the outlet tube 3.

The flask was rotated at 30 rpm and allowed to warm up to ambient temperature. The solid on the surface of the flask 1 melted and was discharged into the Schlenk tube. The liquid was deep red in color and contained finely divided unreacted titanium which was allowed to settle and the clear red titanium(O)ditoluene solution was removed by decantation. The product was stored at −78° C.

EXAMPLE 1

Into a stainless steel mill of 15.2 cm in length and 7.9 cm in diameter, and fitted internally with four metal strips, were introduced 200 steel balls of 12.7 mm diameter and 200 stainless steel balls of 6.35 mm diameter. The mill was sealed, evacuated to 0.2 mm of mercury, and purged with nitrogen to give a nitrogen atmosphere in the mill. 24.5 g of anhydrous magnesium chloride and 7.5 g of the product of Preparation A, were added to the mill which was then rotated at 120 rpm for four days. The temperature of the mill was controlled by continuously spraying water at 20° C. over the mill.

The contents of the mill were washed out with about 200 ml of n-heptane and samples of the suspension were analysed for divalent titanium by the addition of nitrogen purged 2 N sulphuric acid to an aliquot of the sample and thereafter titrating with ceric sulphate. The result of the analysis for divalent titanium was confirmed by the addition of an excess of acidified ferric sulphate to a further aliquot of the sample followed by titration of the ferrous sulphate thus formed with ceric sulphate.

EXAMPLE 2

Into a Megapact Vibration Mill (manufactured by Pilamec, Gloucestershire, England) of internal diameter 3.8 cm and length 56 cm, were introduced 110 stainless steel balls of 12.7 mm diameter and 1700 stainless steel balls of 6.35 mm diameter. The mill was sealed, evacuated to 0.2 mm of mercury and purged with nitrogen to give a nitrogen atmosphere in the mill.

25.6 g of anhydrous magnesium chloride, 6.1 g of aluminum chloride and 5.6 g of the product of Preparation A were mixed together in a reaction vessel by shaking under nitrogen and introduced into the mill under nitrogen. Water at 15° C. was circulated through the jacket of the mill. Milling was effected for a period of 18 hours using a frequency of 2800 oscillations per minute and an amplitude of 2 mm. The contents of the mill were washed out with about 200 ml of n-heptane. A sample of the material was obtained as a dry solid and was found to have a surface area of 5.95 $m^2/g$.

EXAMPLE 3

The procedure of Example 2 was repeated using 29.0 g of anhydrous magnesium chloride, 1.5 g of sodium chloride and 10.45 g of the product of Preparation A.

EXAMPLE 4

38.7 g of anhydrous magnesium chloride was milled for 60 hours using the vibration mill described in Example 2. The milled magnesium chloride was washed out of the mill using 200 ml of toluene. A dry sample of the milled magnesium chloride was found to have a surface area of 44 m²/g.

To the stirred suspension of magnesium chloride in 200 ml of toluene was added a saturated solution in toluene of the product of Preparation A. The addition was continued until the supernatant liquid had a slight red tinge. The solid product was allowed to settle and the supernatant liquid decanted off. The solid was washed by filtration three times with toluene (150 ml for each wash) and three times with n-heptane (150 ml for each wash) and finally suspended in 200 ml of n-heptane.

EXAMPLE 5

The procedure of Example 2 was repeated using only 24.6 g of anhydrous magnesium chloride and 7.4 g of the product of Preparation A.

To the suspension obtained from the mill was added 2 ml of titanium tetrachloride, at ambient temperature (about 20° C.). The mixture was immediately filtered, washed 3 times with 200 ml of n-heptane and finally resuspended in 200 ml of n-heptane.

EXAMPLES 6 TO 12

The products of Examples 1, 4 and 5 were used to polymerize propylene.

The propylene used for the polymerization had been purified by passing gaseous propylene in turn through a column (3 inches diameter, 3 feet length) containing 1/16 inch granules of Alcoa F1 alumina at 50°–60° C., and then through a similar column containing BTS catalyst (Cupric oxide reduced to finely divided metallic copper on a magnesium oxide support) at 40°–50° C., condensing the issue gas and passing the liquid propylene through four columns (all 3 inches diameter; two of 3 feet in length, two of 6 feet in length) at 25° C., each containing 1/16 inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene, etc.) was unchanged at <1 ppm.

A polymerization flask equipped with efficient stirrer and a water jacket was dried carefully and 1 liter of an inert hydrocarbon diluent having a boiling range of about 170°–180° C. was introduced. The diluent was evacuated at 60° C., purged with nitrogen and evacuated which treatment effectively reduced the water and oxygen contents of the diluents to below 10 ppm by weight. The diluent was then saturated with the purified propylene to one atmosphere pressure.

In some of the Examples (as indicated in Table 1), 8 millimoles of triethyl aluminum were introduced. In the other Examples, 8 millimoles of triethyl aluminum, in 50 ml of the hydrocarbon diluent in a separate flask, were mixed, at 0° C., with 3 millimoles of ethyl anisate. This mixture was then transferred immediately to the polymerization flask. Immediately after the addition of the triethyl aluminum, or mixture containing triethyl aluminum, a quantity of the product of one of Examples 1, 4 or 5 was introduced. The pressure in the reaction vessel was maintained at one atmosphere by supply of propylene from a burette. The run was terminated with 10 ml of isopropanol and 5 ml of propylene oxide after a period of time indicated in Table 1, and a sample of supernatant liquid extracted for determining the concentration of soluble polymer dissolved in the polymerization diluent. The solid was filtered and the polymerization flask was washed with a minimum quantity (50 to 100 ml) of petrol ether, and the washings added to the filtered solid. The solid was dried in a vacuum oven at 120° C. for an hour. The yield of solid plus calculated soluble polymer equalled within experimental error the propylene loss from the burette.

The results obtained are set out in Table 1.

TABLE 1

| Example or Comparative Example | Ti component Type (a) | Ti component Amount (mg atom) | EA (b) Amount (mM) | Polymerization Time (min) (c) | Yield of Solid Polymer (g) | % Weight of Diluent Soluble Polymer (d) |
|---|---|---|---|---|---|---|
| 6  | 1 | 0.2 | NIL | 240 | 90   | 49 |
| 7  | 1 | 0.2 | 3.0 | 240 | 18   | 8  |
| 8  | 4 | 0.2 | NIL | 240 | 22.6 | 39 |
| 9  | 5 | 2.0 | NIL | 36  | 68   | 61 |
| 10 | 5 | 0.2 | NIL | 240 | 70   | 46 |
| 11 | 5 | 0.2 | 3.0 | 240 | 40   | 13 |
| 12 | 5 | 0.2 | 3.5 | 240 | 13   | 9  |
| C  | C | 0.2 | NIL | 240 | 3.2  | 46 |

Notes to Table 1
(a) 1, 4 and 5 are the products of Examples 1, 4 and 5. C is the product obtained by vibration milling 24.6 g of anhydrous magnesium chloride and 1.58 g of titanium dichloride as described in Example 2. The titanium dichloride component was the product obtained by heating titanium trichloride (prepared by hydrogen reduction of titanium tetrachloride) under vacuum (less than $10^{-3}$ mm of mercury) at 475° C. for 18 hours to give a product having an analysis of $TiCl_{2.08}$.
(b) EA is ethyl anisate.
(c) From time of adding the titanium component.
(d) % based on total polymer (solid + soluble).

EXAMPLES 13 TO 19

The products of Examples 2 and 3 were used to effect polymerization using liquid propylene.

Polymerization was carried out in a stainless steel autoclave, of total capacity 8 liters, which was fitted with a water-circulation jacket and a vertical anchor stirrer. The autoclave was heated to 65° C., evacuated, and the vacuum was released with propylene (purified as in Examples 6 to 12). The autoclave was then evacuated again and the procedure repeated 5 times and the autoclave was finally brought to a pressure of 2 psi gauge with propylene gas at 30° C. Approximately 50 ml of a heptane solution containing a mixture of triethyl aluminum and ethyl anisate in the amounts indicated in Table 2 were added to the autoclave, followed by the product of Example 2 or Example 3. 5 liters of liquid propylene were added to the autoclave immediately after the addition of the titanium-containing component, the stirrer being operated at 120 rpm. This propylene addition was effected by allowing 5.5 liters of liquid propylene to transfer from a burette at 50° C. to the autoclave. Hydrogen (250 gram millimoles) was added and the temperature of the autoclave contents was raised to 65° C. over 10 minutes. The hydrogen was commercially available hydrogen (99.99% pure) which had been further purified by passing through a column (8 inches by 4 feet in length) containing a molecular sieve material (Union Carbide 3A) at 20° C. The hydrogen was stored in the sieve column and drawn off as required. Polymerization was allowed to proceed at a temperature of 65° C. and a pressure of 435 psi gauge. More hydrogen (48 gram millimoles on each occasion) was added every 30 minutes. After the desired polymerization time, the autoclave was vented over a period of 10 minutes to remove unpolymerized propylene, and a free-flowing powder was obtained. The results obtained are set out in Table 2.

a period of about 30 minutes. The temperature was maintained at 70° C. throughout. 80 millimoles of hydrogen was added during the pressurization stage at a rate of 20 millimoles for each 100 psig rise in propylene pressure. Polymerization was effected at 400 psig and 70° C., and hydrogen was added throughout the polymerization such that 10 millimoles of hydrogen was added for every 200 ml of liquid propylene added from the stock vessel. After 4 hours polymerization, the propylene supply was switched off, and the autoclave vented to atmospheric pressure. The gas cap was purged with nitrogen and the polymer emptied out. The polymer obtained was a free-flowing, greyish powder.

The initial charge of 400 g of polypropylene had the following characteristics:

Titanium content: 43 ppm by weight

Melt flow index (measured by ASTM Test Method D 1238-70, Condition N, that is at 190° C. and 10 Kgm): 21

Flexural Modulus: 1.38 GN/m$^2$

A total of 1245 g of polymer was obtained, that is 845 g

TABLE 2

| Example | Ti component Type (e) | Ti component Amount (mg atom) | TEA (f) Amount (mM) | EA (b) Amount (mM) | Polymerization Time (min) (c) | Yield of Solid Polymer (g) | Found Ti (ppm) | Flexural Modulus (g) (GN/m$^2$) |
|---|---|---|---|---|---|---|---|---|
| 13 | 2 | 1.0 | 90 | 34 | 240 | 1410 | 32 | 1.11 |
| 14 | 2 | 1.0 | 60 | 24 | 240 | 1200 | 40 | 1.12 |
| 15 | 2 | 1.0 | 60 | 24 | 5 | 480 | 93 | 0.95 |
| 16 | 2 | 1.0 | 30 | 11 | 160 | 2170 | 23 | 0.92 |
| 17 | 2 | 0.5 | 30 | 11 | 240 | 470 | 53 | 1.11 |
| 18 | 2 | 1.0 | 15 | 6 | 120 | 1600 | 30 | N.D. |
| 19 | 3 | 1.0 | 90 | 34 | 240 | 1000 | 33 | 1.09 |

Notes to Table 2
(b) and (c) are as defined in Notes to Table 1.
(e) 2 and 3 are the products of Examples 2 and 3.
(f) TEA is triethyl aluminum.
(g) The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip had dimensions of approximately 150 × 19 × 1.6 mm and was prepared as follows: 23 g of the polymer was mixed with 0.1% by weight of an antioxidant ('Topanol' CA), and the mixture was added to a Brabender Plasticizer, at 190° C., 30 rpm and under a load of 10 kg to convert it to a crepe. The crepe was placed within a template, between aluminum foil, and pressed by means of an electric Tangye Press at a temperature of 250° C. The pressing was pre-heated for a period of six minutes, under just enough pressure to make the polymer flow across the template, that is an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C., and after 2 hours at this temperature the heat was switched off and the oven cooled to ambient temperature at 15° C. per hour.

EXAMPLE 20

Polymerization was carried out in a steel autoclave of capacity 8 liters fitted with an anchor stirrer/scraper. 400 grams of dry polypropylene was added while stirring the autoclave at 70° C. The stirrer speed was 120 rpm. The autoclave was evacuated, after half an hour the vacuum was released with propylene, and then the autoclave was re-evacuated. This procedure was repeated a further five times over an hour and a half to leave a slight excess pressure (2 psig) of propylene in the autoclave. The stirrer was stopped and a solution, in 50 ml of n-heptane, of 30 millimoles triethyl aluminum and 11 millimoles of ethyl anisate was injected into the autoclave by means of a syringe. The autoclave contents were stirred for 10 minutes, the stirrer was stopped and a suspension in heptane of the product of Example 1 was added in an amount sufficient to provide 0.31 milligram atom of titanium. The stirrer was restarted and propylene gas was then admitted to the top of the autoclave from a heated stock vessel containing liquid propylene. A pressure of 400 psi gauge was established over of polymer were formed during the polymerization period. The titanium content of the total polymer (initial charge plus polymer formed) was 26 ppm by weight.

EXAMPLE 21

100 ml of the solution of titanium(O)ditoluene obtained as described in Preparation B, after separation from the unreacted titanium, were added slowly to 20 g of a stirred dry sample of magnesium chloride which had been milled in a vibration mill as described in Example 2. When the addition was complete, the mixture was stirred for 2 hours and then allowed to settle. The color of the supernatant was pale pink. The mixture was filtered and the solid was resuspended in 100 ml of n-heptane.

The suspension of the solid in n-heptane was stirred at ambient temperature, 10 ml of titanium tetrachloride were added and the mixture was stirred for one hour. The mixture was filtered and the solid was washed, by filtration, 6 times with 100 ml of n-heptane each time, to remove the excess of titanium tetrachloride. The solid was finally suspended in 100 ml of n-heptane.

EXAMPLES 22 TO 24

The contacting procedure of Example 21 was repeated using 45 g of milled magnesium chloride and 150 ml of the titanum(O)ditoluene solution. After being resuspended in 300 ml of n-heptane, the mixture was separated into three 100 ml portions.

One of the portions (Example 22) was given no further treatment.

Over one portion (Example 23) was passed anhydrous hydrogen chloride gas for one hour, with stirring of the suspension. The suspension was filtered and the solid washed 5 times with 100 ml of n-heptane each time. The solid was finally resuspended in 100 ml of n-heptane.

The third portion (Example 24) was treated with 15 ml of titanium tetrachloride, the procedure being as described in Example 21.

EXAMPLE 25

25 g of magnesium chloride were milled in a vibration mill as described in Example 2. The milled magnesium chloride was contacted with 150 ml of a toluene solution of titanium(O)ditoluene using the procedure of Example 21. The product obtained was then treated with anhydrous hydrogen chloride gas as described in Example 23.

EXAMPLE 26

25 g of anhydrous magnesium chloride were vibration milled, in the presence of 3 ml of n-butyl chloride, using the milling procedure of Example 2. The milled product, in the dry state, was then contacted with a toluene solution of titanium(O)ditoluene as in Example 21. On allowing the mixture to settle, it was found that the supernatant liquid was clear and water-white. The mixture was given no further treatment.

EXAMPLE 27

The procedure of Example 26 was repeated except that the magnesium chloride was milled in the presence of 4 ml of toluoyl chloride.

EXAMPLES 28 TO 39

The polymerization procedure of Examples 6 to 12 was repeated using the products of Examples 21 to 27 in amounts sufficient to provide 0.2 milligram atoms of titanium (estimated by treatment with sulphuric acid and titration with ceric sulphate as in Example 1). All polymerizations were effected for four hours. The results obtained are set out in Table 3.

TABLE 3

| Example (h) | Ti component Type (i) | EA (b) Amount (mM) | Yield of Solid Polymer (g) | % Weight of Diluent Soluble Polymer (d) |
|---|---|---|---|---|
| 28 | 21 | NIL | 17.5 | 26.9 |
| 29 | 21 | 3.0 | 5.0 | 4.8 |
| 30 | 22 | NIL | 1.0 | 38.5 |
| 31* | 22 | NIL | 1.6 | 37.5 |
| 32 | 23 | NIL | 24.0 | 34.6 |
| 33 | 23 | 3.0 | 2.9 | 4.0 |
| 34 | 24 | NIL | 51.3 | 32.0 |
| 35 | 25 | NIL | 23.4 | 40.5 |
| 36 | 25 | 3.0 | 5.5 | 11.2 |
| 37 | 26 | NIL | 3.5 | 47.5 |
| 38 | 27 | NIL | 30.7 | 44.7 |
| 39 | 27 | 3.0 | 20.1 | 5.4 |

Notes to Table 3
(b) and (d) are as defined in Notes to Table 1.
(h) In Example 31*, 0.6 mM of n-butyl chloride were added to the polymerization mixture, after adding the aluminum triethyl but before adding the titanium component.
(i) 21 to 27 are the products of Examples 21 to 27.

EXAMPLE 40

The procedure of Examples 13 to 19 was repeated using, as the catalyst system, 0.22 milligram atoms of the product of Example 27, 20 millimoles of triethyl aluminum and 7.3 millimoles of ethyl anisate. Polymerization was terminated after one hour when a yield of 825 g of polypropylene was obtained. The polymer was found to contain 16 ppm by weight of titanium by X-ray fluorescence spectrometry. The flexural modulus of the polymer was 1.20 $GN/m^2$.

EXAMPLE 41

A 3 liter autoclave was charged with 2 liters of hexane and 1.0 g of alumina (Ketjen Grade B alumina dried under nitrogen at 500° C. for 2 hours). Purified ethylene was added to raise the pressure to 75 psig, and the autoclave was depressurized to atmospheric pressure. A solution containing 0.15 millimoles of titanium(O)ditoluene (obtained by the procedure of Preparation B) was added and ethylene readmitted to give a pressure of 75 psig. An initial exotherm raised the temperature from 70° C. to 80° C., which latter temperature was maintained for a period of 1 hour, during which time ethylene was continuously admitted to the autoclave to maintain the pressure at 75 psig. 600 g of high molecular weight polyethylene, insoluble in the diluent, was obtained which, on being dried, gave a free-flowing white powder.

EXAMPLE 42

The procedure of Example 41 was repeated except that the alumina was contacted with the titanium compound in a separate vessel in the absence of ethylene. The contacting was effected at 0° C. by the addition of the toluene solution of the titanium(O)ditoluene to a hexane suspension of the alumina. The color of the titanium compound was discharged from the solution affording a clear, water-white supernatant liquid. The mixture thus produced was introduced into the autoclave when the ethylene pressure was atmospheric pressure. A similar yield of polymer was obtained as in Example 41.

COMPARATIVE EXAMPLE D

The procedure of Example 41 was repeated except that the alumina was absent. No exotherm was observed, and only 0.4 g of a white solid was produced.

EXAMPLE 43

A 1 liter autoclave was charged with hexane (500 ml) and alumina (1.0 g), heated to 35° C. and pressurized with purified propylene to give a total pressure of 150 psig. Titanium(O)ditoluene (0.3 mmol) in toluene was admitted. The autoclave was maintained at 35° C. for a period of one hour with continuous admission of propylene to maintain the pressure at 150 psig. 35 g of polypropylene was obtained. This consisted of a diluent insoluble portion (51%) which was principally isotactic material and was obtained as a free-flowing white powder, and a diluent soluble portion (49%) which was principally atactic material.

EXAMPLE 44

The polymerization procedure of Example 41 was repeated using a different catalyst system which was introduced when the ethylene pressure was atmospheric pressure. The catalyst was 8 millimoles of triethyl aluminum followed by the product of Example 1 in a quantity sufficient to provide 0.2 milligram atoms of titanium. Polymerization was continued for 2.5 hours at 80° C. and a total pressure of 75 psig using a flow rate of 300 liters per hour of ethylene and 100 liter per hour of hydrogen gas. 450 g of polyethylene, having a melt flow index (measured at 190° C. with a 2.16 kg weight) of greater than 100, was obtained.

EXAMPLE 45

The procedure of Example 44 was repeated using 4 millimoles of triethyl aluminum and sufficient of the titanium compound to provide 0.1 milligram atoms of titanium. Polymerization was continued for 3 hours at 80° C. and a total pressure of 75 psig using 370 liters per hour of ethylene and 30 liters per hour of hydrogen. 500 g of polyethylene, of melt flow index 25, was obtained.

EXAMPLE 46

To a suspension, in 100 ml of n-heptane, of 20 g of alumina of the type used in Example 41 was added 150 ml of a solution in toluene of titanium(O)ditoluene prepared as described in Preparation B. On completion of the addition of the solution of the titanium compound, the supernatant liquid was clear and water-white.

8 ml of the suspension thus obtained (containing about 0.2 milligram atoms of titanium) were added, at ambient temperature, to a steel autoclave of 60 ml capacity which was fitted with a stirrer. The autoclave was cooled in liquid nitrogen and 20 ml of butadiene were distilled into the autoclave, which was allowed to warm up to ambient temperature and then rapidly heated to 65° C. whilst stirring the contents of the autoclave. After one hour at 65° C., with stirring, the autoclave was cooled and the excess, unreacted butadiene was vented off. 9 g of polybutadiene were obtained.

EXAMPLE 47

The procedure of Example 44 was repeated using 8 millimoles of aluminum triethyl and sufficient of the titanium compound to provide 0.2 milligram atoms of titanium. 125 ml of hexene-1 were added initially and the ethylene was passed into the reaction vessel at a low rate of 300 liters per hour and at a total pressure of 75 psi gauge and a further 40 ml of hexene-1 were added during the polymerization. After 2 hours polymerization, 350 g of an ethylene/hexene-1 copolymer was obtained which had a melt flow index of 2.5, a hexene-1 incorporation of 6.6% molar and a density of less than 0.94 g/cm$^3$.

EXAMPLE 48

The procedure of Example 47 was repeated except that there was no initial quantity of hexene-1, and 60 ml of hexene-1 was added during the course of the polymerization. A yield of 530 g was obtained and the product had a melt flow index of 0.002, a hexene-1 incorporation of 0.9% molar and a density of between 0.94 and 0.95 g/cm$^3$.

EXAMPLES 49 TO 59

Several samples of titanium(O)ditoluene were prepared by the procedure of Preparation B, and these were then supported on alumina. The titanium(O)ditoluene was stored at −78° C. using a methanol/solid carbon dioxide mixture. The solution of the titanium compound was added to 20 g of alumina (Grade B alumina dried under nitrogen at 500° C. for 2 hours) at −78° C., the mixture was stirred for two hours, allowed to warm up to room temperature and then allowed to settle.

The supported product was then used to polymerize propylene in an autoclave of 5 liters nominal capacity.

Three liters of the hydrocarbon diluent used in Examples 6 to 12 were introduced into the autoclave and heated up to the polymerization temperature. In some of the polymerizations, a quantity of an organoaluminum compound was added. The supported titanium compound was then added in a quantity sufficient to provide 2 milligram atoms of titanium. In some examples, hydrogen was then added. Finally, propylene was added in a sufficient quantity to raise the pressure to 100 psi gauge. Polymerization was continued for four hours, the pressure being maintained at 100 psi gauge by the addition of propylene and, in those example in which hydrogen was used, intermittent additions of hydrogen were also made.

At the end of the four hour polymerization period, the autoclave was vented, nitrogen was introduced to give a slight excess pressure (about 2 psi gauge) and the polymer suspension was run out of the autoclave. A small aliquot of the polymer suspension was collected and allowed to settle to determine by evaporation the proportion of diluent soluble polymer formed. The major portion of the polymer suspension was filtered, the polymer was washed with petroleum ether and then dried in a vacuum oven at 100° C. and 15 mm pressure for 24 hours.

Further details of the polymerization conditions, and the yield of solid and soluble polymer obtained are set out in Table 4.

TABLE 4

| Example No. | Activator Type (f) (j) | Activator Amount (mM) | Temp (°C.) | H$_2$ Amount (% by volume relative to propylene) | Yield of Solid Polymer (g/mM of Ti) | Proportion of diluent soluble Polymer (%) |
|---|---|---|---|---|---|---|
| 49 | NIL | — | 60 | NIL | 72* | 1.23** |
| 50 | NIL | — | 100*** | NIL | >30 | N.D. |
| 51 | NIL | — | 70 | NIL | 40 | 0.86 |
| 52 | TEA | 10 | 60 | NIL | 16 | N.D. |
| 53 | TEA | 2 | 70 | NIL | 30 | N.D. |
| 54 | DEAC | 2 | 70 | NIL | 65.6 | N.D. |

TABLE 4-continued

| Example No. | Activator Type (f) (j) | Activator Amount (mM) | Temp (°C.) | H₂ Amount (% by volume relative to propylene) | Yield of Solid Polymer (g/mM of Ti) | Proportion of diluent soluble Polymer (%) |
|---|---|---|---|---|---|---|
| 55 | NIL | — | 60 | 0.1 | 115⁺ | 1.34 |
| 56 | NIL | — | 60 | 1.0 | 64 | 2.8 |
| 57 | NIL | — | 70 | 1.0 | 65⁺⁺ | 2.83 |
| 58⁺⁺⁺ | NIL | — | 70 | NIL | 49 | N.D. |
| 59° | TEA | 2 | 70 | NIL | ~5 | N.D. |

Notes to Table 4
(f) is as defined in Notes to Table 2
(j) DEAC is diethyl aluminum chloride
*Average of four results
**Average of three results
***Cooled to 60° C. and then vented
⁺This result is believed to be too high, due to the presence of diluent trapped in the polymer particles
⁺⁺Average of two results
⁺⁺⁺Support was a $SiO_2/Al_2O_3$ powder (Ketjen Grade 5P, dried at 500° C. for 2 hours under $N_2$)
°A sample of the catalyst used in Example 58 was stirred for 15 minutes with an equimolar proportion of $TiCl_4$ (as a solution of $TiCl_4$ in heptane), the solid was allowed to settle and the supernatant liquid was removed.

The polymer product obtained in all the examples appeared similar and a series of tests was carried out on the product of one of the runs forming example 49. The results of the tests are set out in Table 5.

TABLE 5

| Test | Result |
|---|---|
| Melt flow index (ASTM Test Method D 1238-70) | |
| Determined at 190° C. and 10 kg | <0.01 |
| Determined at 230° C. and 10 kg | 0.08 |
| Head-to-head units (k) (infrared spectroscopy) (13Cnmr) | about 4 per 100 propylene units |
| Isotactic polymer (l) | 80% |
| Racemic diads (m) | 9.3% |
| Elongation (n) | >1000% |
| Glass Transition temperature (p) | <−10° C. |
| Low temperature brittle point (q) | −26° C. |

Notes to Table 5
(k) Determined from an absorption band at 752 cm⁻¹ in the infrared spectrum and chemical shifts of 16.9, 17.3, 31.0, 34.5, 35.5 and 38.3 ppm by 13Cnmr relative to tetramethyl silane.
(l) Determined from the triads which are mm centered by C13nmr of the α-methyl resonance.
(m) Determined using 100 MHz proton nmr. The results are expressed as % racemic units, that is the number of r units (specifically as mrm or rrr) per 100 repeat units in the polymer.
(n) Determined using Instron Testing Machine at 20° C. using a cross-head speed of 5 mm/minute up to 100% elongation, and 50 mm/minute above 100% elongation. The samples used were strips measuring 5 cm × 1 cm × 1 mm cut from a 1 mm thick sheet compression molded at 20 tons per square inch and 215° C., quenched in cold water and then annealed by placing in an oven between glass plates at 100° C. for 4 hours and allowing to cool to room temperature overnight. At 1000% elongation, the apparent stress was 17.5 MN/m² and the specimen did not break. On releasing the stress, the specimen contracted to an elongation of 200%.
(p) Measured using a torsional pendulum following the procedure of I.S.O. Recommended method R 537 (Procedure B).
(q) Performed using an apparatus constructed in accordance with and using the procedure of I.S.O. Recommended method R 974.

In a polymerization carried out using the conditions of Example 49 and a temperature of 20° C., a negligible yield of solid polymer was obtained.

In a further polymerization effected using a catalyst supported on silica, and a polymerization temperature of 70° C., a negligible yield of solid polymer was obtained. A similar effect was obtained using a catalyst supported on chlorinated alumina. Similar effects were also obtained using unsupported titanium(O)ditoluene as the catalyst and unsupported titanium(O)ditoluene which had been degraded by standing at ambient temperature for 24 hours.

EXAMPLES 60 AND 61

Polymerization was effected in the gas phase using titanium(O)ditoluene supported on alumina and prepared as described for Examples 49 to 59.

40 gms of dry polypropylene powder was stirred in a 2 liter glass flask fitted with an anchor stirrer formed from polytetrafluoroethylene. A water jacket kept the flask at the required temperature. The flask was evacuated to 1.0 mm of Hg and then pressurized to atmospheric pressure with dry nitrogen to remove air and moisture from the apparatus. This was repeated twice more. The evacuation and pressurization procedure was then effected three times with propylene containing the proportion of hydrogen specified in Table 6.

After the addition of the catalyst system, (containing 2 milligram atoms of titanium) propylene, containing hydrogen as specified, was added continuously from a metering device so as to maintain the pressure within the apparatus at atmospheric pressure. Polymerization was allowed to continue for the time indicated in Table 6, this being measured from the time that the titanium containing material was introduced. The total product was then removed from the apparatus and dried.

TABLE 6

| Example No. | Hydrogen Amount (% by volume relative to propylene) | Temperature (°C.) | Time (hours) | Yield of Solid Polymer (g/mM of Ti) |
|---|---|---|---|---|
| 60 | NIL | 65 | 4.0 (r) | 5 |
| 61 (s) | 0.1 | 40–60 (t) | 6.0 | 6 |

Notes to Table 6
(r) Pressure reduced to 1.0 mm of Hg for 5 minutes after 3 hours polymerization, this did not effect the polymerization rate.
(s) In this experiment, no carrier polymer was used.
(t) The initial temperature was 40° C. and was raised to 60° C. after 1.5 hours.

Further experiments were carried out at 40° C. in the presence of organo-aluminum compound (triethyl aluminum or diethyl aluminum chloride) but negligible quantities of polymer product were obtained under these conditions.

C. Preparation of a toluene solution titanium dichloride-aluminum chloride-toluene complex This complex was prepared in a manner similar to Preparation A, using 24 g aluminum powder, 32.4 g of aluminum chloride. 24.2 g of titanium tetrachloride and 1 liter toluene. The mixture was refluxed for 8 hours, cooled to 0° C. for 2 hours and then filtered, to yield a solution which was 0.0503 molar.

EXAMPLE 62

6.8 g of alumina (Ketjen, Grade B, dried under nitrogen at 500° C. for 2 hours) were slurried in 136 ml dried heptane (that is 20 ml heptane for each gram of $Al_2O_3$). 19.9 ml of the toluene solution from Preparation C were added to 20 ml of the stirred slurry of $Al_2O_3$ to yield a product containing 1 mM titanium complex adsorbed on 1 g $Al_2O_3$. The product prepared as described was used in a sufficient quantity to provide one milligram atom of titanium to polymerize propylene at 60°. The polymerization technique was as described in Examples 6 to 12. After 1 hour, 1.8 g of a solid, insoluble polymer was obtained.

We claim:

1. A process for the production of a hydrocarbon polymer wherein at least one ethylenically unsaturated hydrocarbon monomer is contacted with a polymerization catalyst which contains a compound of a transition metal, other than zirconium, of Group IVA of the Periodic Table, wherein the said compound contains at least one $\pi$-bonded arene group, and is supported on a particulate inorganic compound which is (A) an inorganic oxide, an inorganic hydroxide, an inorganic oxyhalide, an inorganic hydroxyhalide or an inorganic halide; (B) a mixture of at least two compounds from (A); or (C) a compound obtained by the reaction of at least two compounds from (A).

2. A process for the production of a hydrocarbon polymer wherein at least one ethylenically unsaturated hydrocarbon monomer is contacted with a polymerization catalyst which contains a compound of titanium, wherein the said compound contains at least one $\pi$-bonded arene group, and is supported on a particulate inorganic compound which is (A) an inorganic oxide, an inorganic hydroxide, an inorganic oxyhalide, an inorganic hydroxyhalide or an inorganic halide; (B) a mixture of at least two compounds from (A); or (C) a compound obtained by the reaction of at least two compounds from (A).

3. The process of claim 1 or claim 2 wherein the catalyst contains a titanium dichloride-aluminum chloride-arene complex supported on magnesium chloride or alumina.

4. The process of claim 1 or claim 2 wherein the catalyst contains a titanium dichloride-aluminum chloride-arene complex supported on magnesium chloride admixed with aluminum chloride or sodium chloride.

5. The process of claim 1 or claim 2 wherein the catalyst contains a titanium dichloride-aluminum chloride-arene complex supported on magnesium chloride and treated with titanium tetrachloride.

6. The process of claim 1 or claim 2 wherein the catalyst contains titanium(O)ditoluene supported on magnesium chloride.

7. The process of claim 1 or claim 2 wherein the catalyst contains titanium(O)ditoluene supported on alumina.

8. The process of claim 1 or claim 2 wherein the catalyst contains titanium(O)ditoluene supported on magnesium chloride and treated with titanium tetrachloride or hydrogen chloride.

9. The process of claim 1 or claim 2 wherein the catalyst contains titanium(O)ditoluene supported on magnesium chloride which has been treated with butyl chloride or toluoyl chloride.

10. The process of claim 7 wherein ethylene is polymerized.

11. The process of claim 3 wherein propylene is polymerized.

12. The process of claim 7 wherein propylene is polymerized.

13. The process of claim 1 or claim 2 wherein the polymerization catalyst also includes at least one organo-metallic compound of aluminum or of a non-transition metal of Group IIA of the Periodic Table or a complex of an organo-metallic compound of a non-transition metal of Groups IA or IIA of the Periodic Table and an organic aluminum compound.

14. The process of claim 13 wherein the polymerization catalyst also contains an organic-Lewis Base compound which is an aromatic ester.

15. A process for the production of a propylene polymer wherein propylene is contacted with a polymerization catalyst comprising a transition metal component, an organo-aluminum compound and an organo-Lewis Base compound wherein the transition metal component is a compound of a transition metal of Group IVA of the Periodic Table, which compound contains at least one $\pi$-bonded arene group, and which is supported on a particulate inorganic halide.

16. The process of claim 15 wherein the transition metal component is either titanium(O)ditoluene, or a titanium dichloride-aluminum chloride-arene complex, supported on magnesium chloride.

17. The process of claim 15 wherein the organo-aluminum compound is aluminum triethyl and the Lewis Base is an aromatic ester.

18. A process for the production of a hydrocarbon polymer wherein at least one ethylenically unsaturated hydrocarbon monomer is contacted with a polymerization catalyst which contains a titanium dichloride-aluminum chloride-arene complex supported on a particulate inorganic compound which is (A) an inorganic oxide, an inorganic hydroxide, an inorganic oxyhalide, an inorganic hydroxyhalide or an inorganic halide; (B) a mixture of at least two compounds from (A); or (C) a compound obtained by the reaction of at least two compounds from (A).

19. A solid polypropylene polymer having a melt flow index (measured at 190° C. using a 10 kg weight) of not greater than 0.02, and containing at least three head-to-head units for each 100 propylene units.

20. The polymer of claim 19 which has a melt flow index of less than 0.01 and contains at least four head-to-head units for each 100 propylene units.

21. The polymer of claim 19 which has an isotactic content of at least 70%.

22. The polymer of claim 19 which has a proportion of at least 5% of racemic diads.

23. The polymer of claim 19 which has a glass transition temperature of below 0° C.

24. The polymer of claim 19 which has a low temperature brittle point which is below $-20°$ C.

* * * * *